United States Patent [19]

Nakanishi et al.

[11] Patent Number: 4,910,100

[45] Date of Patent: Mar. 20, 1990

[54] SOLID ELECTROLYTE FUEL CELL

[75] Inventors: Tsuneo Nakanishi; Kazuo Koseki; Shinichi Maruyama; Hiroyuki Shundo, all of Kanagawa, Japan

[73] Assignee: Fuji Electric Co., Ltd., Kanagawa, Japan

[21] Appl. No.: 383,184

[22] Filed: Jul. 21, 1989

[51] Int. Cl.[4] ............................................. H01M 8/10
[52] U.S. Cl. ....................................... 429/32; 429/35; 429/39
[58] Field of Search ....................... 429/30, 32, 34, 35, 429/36, 38, 39, 26

[56] References Cited

U.S. PATENT DOCUMENTS

| 4,407,904 | 10/1983 | Vozumi et al. | 429/39 X |
| 4,490,445 | 12/1984 | Hsu | 429/32 |
| 4,510,212 | 4/1985 | Fraioli | 429/30 |
| 4,753,857 | 6/1988 | Hosaka | 429/38 |
| 4,761,349 | 8/1988 | McPheeters et al. | 429/39 |

Primary Examiner—Anthony Skapars
Attorney, Agent, or Firm—Finnegan, Henderson, Farabow, Garrett and Dunner

[57] ABSTRACT

In a solid electrolyte fuel cell, reactant gases are directed by the reactant gas distributing means to flow radially between its central and peripheral portions and this obviates the need to provide an overall gas seal between the individual components of the fuel cell. A gas seal, if necessary at all, may be provided in selected areas. This permits the individual members of the fuel cell to freely slide with respect to one another during thermal expansion or contraction. The radial flow of reactant gas streams effectively reduces the travel path, and hence the concentration gradient, of the reactant gases. This contributes to the accomplishment of a solid electrolyte fuel cell having improved reliability and characteristics. As a further advantage, the discharged reactant gases may be burnt in a combustion chamber and a solid electrolyte fuel cell having a higher thermal efficiency can be realized by making use of the resulting heat of combustion.

19 Claims, 8 Drawing Sheets

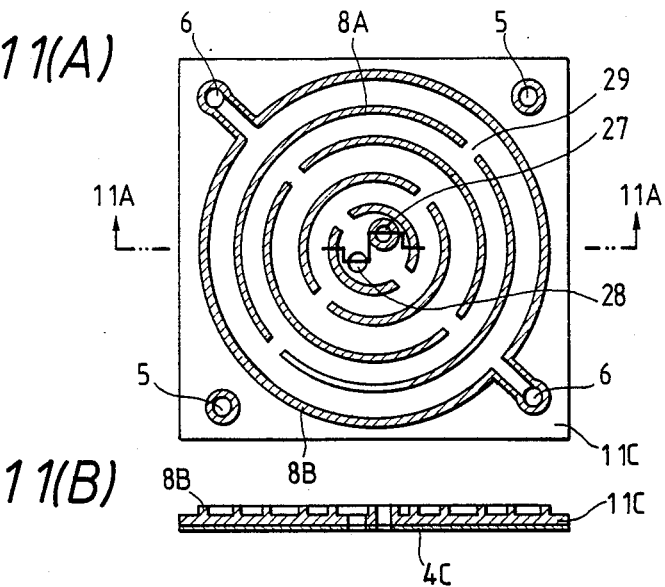
FIG. 11(A)
FIG. 11(B)
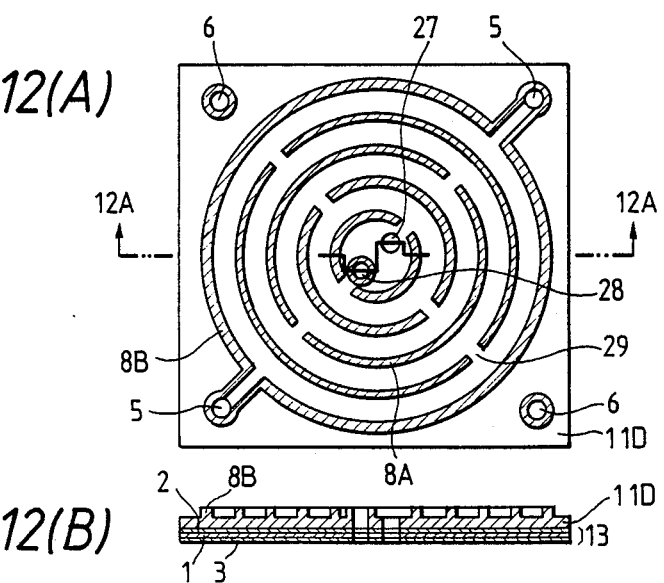
FIG. 12(A)
FIG. 12(B)

SOLID ELECTROLYTE FUEL CELL

BACKGROUND OF THE INVENTION

1. Field of the Invention:

The present invention relates to a solid electrolyte fuel cell that converts the free energy of a solid electrolyte to electrical energy by an electrochemical reaction and, in particular, to the reliability, operating characteristics and thermal efficiency of such a cell.

2. Description of the Related Art:

Conventional power generators which employ heat engines such as gas turbines and diesel engines are subject to Carnot cycle efficiency limits. In contrast, the efficiency of fuel cells is dependent on the relationship between the change in the free energy of the underlying electrochemical reaction and the enthalpy of that reaction, and hence is expected to be higher than the efficiency of conventional power generators. Because of this advantage, the use of fuel cells as power generators will contribute to efficient utilization of resources and to a relative decrease in the level of $CO_2$ emissions and an extremely low level of $NO_x$ emissions. Fuel cells therefore hold much promise as a powerful means for curbing the aggravation of the environment by air pollution.

A fuel cell consists of an electrolyte plate sandwiched between two electrodes, the oxygen electrode (cathode) and the fuel electrode (anode). Oxygen or air is supplied to the oxygen electrode whereas hydrogen, a reformed gas obtained by reforming (or processing) hydrocarbons such as natural gas, methanol and petroleum, or coal gas is supplied to the fuel electrode. The supplied oxygen combines electrochemically with the hydrogen in the fuel to produce both electricity and water. Fuel cells can be classified by electrolyte and the four predominant types developed so far comprise alkali electrolyte fuel cells, phosphoric acid electrolyte fuel cells, molten carbonate electrolyte fuel cells, and solid electrolyte fuel cells. Solid electrolyte fuel cells make use of solid oxides and are operated at temperatures of 900°–1,000° C.

In a solid electrolyte fuel cell, oxygen ions ($O^{2-}$) migrate through a porous ceramic electrolyte such as yttria stabilized zirconia ($ZrO_2$—$Y_2O_3$).
The reaction occurring at the oxygen electrode is:

$$1/2O_2 + 2e^- = O^{2-} \tag{1}$$

The reaction taking place at the fuel electrode are:

$$H_2 + O^{2-} = H_2O + 2e^- \tag{2}$$

$$CO + O^{2-} = CO_2 + 2e^- \tag{3}$$

The overall reactions in the cell are:

$$1/2O_2 + H_2 = H_2O \tag{4}$$

$$1/2O_2 + CO = CO_2 \tag{5}$$

One major advantage of solid electrolyte fuel cells is that CO can be directly used as a fuel as it would be in the case of molten carbonate electrolyte fuel cells, so that reformed gases obtained by reforming hydrocarbon fuels such as natural gas, methanol and petroleum can be directly supplied to the cell without being passed through a CO converter. Even the fuel reformer (or processor) can be eliminated since the high operating temperature (1,000° C.) combined with the use of Ni as the fuel electrode material enables the fuel gas to be reformed within the cell. This feature offers the added advantage that the fuel supply system for solid electrolyte fuel cells is much simpler in construction than those for other types of fuel cells. Furthermore, the temperature of the gas discharged from solid electrolyte fuel cells is high enough to expand the scope of applications of the heat of the exhaust gases.

The structure of single cells in solid electrolyte fuel cells may be roughly divided into two types. One is a cylindrical type that is described in U.S. Pat. No. 3,460,991, or in the 1983 National Fuel Cell Seminar, Nov. 13–16, 1983, Oakland, Fla., p. 78 and/or in 1985 Fuel Cell Seminar, May 19–22, 1985, Tucson, Ariz., p. 95. The other type is a flat or planar one that is described in U.S. Pat. No. 3,554,808, of U.S. Pat. No. 4,490,445 or 1983 National Fuel Cell Seminar, ibid., p. 74. Solid electrolyte fuel cells which are basically composed of ceramic materials are mechanically brittle and are prone to failure on account of the thermal stress that would be produced by thermal expansion mismatch and nonuniformity in power generation by the cell. These problems have long prevented the development of practically feasible models of solid electrolyte fuel cells. However, as the above-cited U.S. patents show, electrode and separator materials having thermal expansion coefficients substantially the same as those of electrolyte materials were discovered and this led to the fabrication of experimental cells and the conducting of power generation tests on these cells. In particular, the cell system described in 1983 National Fuel Cell Seminar, Nov. 13–16, 1983, Oakland, Fla., p. 78, is designed for circumventing thermal expansion and provides higher reliability for single cells. However, the individual cells in this system are connected by a nickel felt pad which is not capable of complete thermal expansion absorption. In addition, current will flow along the surfaces of thin electrodes and the resulting increase in resistance (ohmic) loss will lead to lower power densities.

Among the planar type cells proposed to date, the one reported in 1983 National Fuel Cell Seminar Nov. 13–16, Oakland, Fla., p. 74, is of a monolithic design constructed by sintering an assembly of an electrolyte, electrodes and a separator and features the ability to produce an extremely high output power density. However, not only does this system require a sophis fabricating technique but it also is substantially incapable of circumventing thermal expansion, thus making it impossible to fabricate a device of large size. In other words, a limited scope of utility is the major defect of this cell design. The fuel cell described in U.S. Pat. No. 4,490,445 comprises single cells which are held between ribbed separator plates and which are each fabricated by sintering an assembly of electrodes (0.003–0.005 inch) coated on opposite sides of a thin disk (0.01–0.02 inch) of $ZrO_2$—$Y_2O_3$ which serves as an electrolyte. In the absence of a tight gas seal, this cell design is capable of circumventing the thermal expansion of individual cells.

However, in the fuel cell described above, the reactant gases flow diametrically along the principal surfaces of single cells, so the travel path of the reactant gases tends to become longer and the resulting increase in their concentration gradient leads to a greater degree of nonuniformity in the cell output distribution on the cell surfaces.

SUMMARY OF THE INVENTION

An object of the present invention is a solid electrolyte fuel cell in which the individual components are adapted to be freely slidable with respect to one another and the travel path of reactant gases is made sufficiently short to circumvent thermal failure of the cell components in the face of temperature changes encountered by the fuel cell, thereby ensuring improved reliability and operating characteristics.

Another object of the present invention is to provide a solid electrolyte fuel cell that insures improved thermal efficiency by making use of the heat of combustion of the gas to be discharged from the cell.

The above-stated objects and other objects of the present invention are attained by a solid electrolyte fuel cell comprising planar single cells each having a cathode and an anode disposed on the two principal surfaces of a solid electrolyte substrate and having superposed thereon reactant gas distributing means for supplying individually two reactant gases, an oxidant gas and a fuel gas, to the two electrodes of each single cell, characterized in that the fuel cell includes reactant gas distributing means having guide vanes for directing the reactant gases into the space between the central and peripheral portions and for establishing electrical connection to the single cells, and manifolds penetrating through the central area of the superposed single cells and reactant gas distributing means to permit the parallel flows of reactant gases to be supplied to or discharged from the anode and cathode of each single cell.

Another embodiment of the present invention comprises reactant gas distributing means that having guide vanes for directing the reactant gases into the space between the central and peripheral portions and for establishing electrical connection to the single cells and also having a reactant gas discharge slit in the peripheral portion for allowing the reactant gases to be discharged manifolds penetrating through the central area of the superposed single cells and reactant gas distributing means and to permit the parallel flows of reactant gases to be supplied to the anode and cathode of each single cell, a flame barrier disposed around a cell stack comprising the superposed single cells and reactant gas distributing means for blocking a combustion flame if such is generated around the cell stack, and a heat insulator that accommodates the cell stack and the flame barrier, with a preheating chamber being interposed.

In still another embodiment, the fuel cell of the present invention includes reactant gas distributing means having guide vanes for directing the reactant gases into the space between the central and peripheral portions and for establishing electrical connection to the single cells and having a guide vane in the peripheral portion for sealing the reactant gases, manifolds that penetrate through the central area of the superposed single cells reactant gas distributing means to permit the parallel flows of reactant gases to be supplied to or discharged from the anode and cathode of each single cell and manifolds and to penetrate through the superposed single cells reactant gas distributing means in their peripheral portion and inward of the reactant gas sealing guide vane, and a combustion chamber adjoining a stack chamber for accommodating the cell stack comprising the superposed single cells and reactant gas distributing means and being partitioned from the stack chamber by a flame retarding wall.

The single cells may be formed either as self-supporting thin sheets or as membranes that are supported on a substrate. Self-supporting single cells do not use a supporting substrate. The same applies to the reactant gas distributing means and they may be either a porous substrate having a separator plate or guide vanes which both are in the form of a self-supporting dense thin sheet, or a porous or dense substrate having a dense separator membrane on one principal surface and guide vanes on the other principal surface. The manofolds supply a fuel gas to the anode of each single cell or allow the fuel gas to be discharged after the reaction. Furthermore, the manifolds supply an oxidant gas to the cathode of each single cell or allow the oxidant gas to be discharged after the reaction. The manifolds may be formed of reactant gas pipes or alternatively, they may be formed by interconnecting reactant gas passage holes that are formed across the thickness of the superposed single cells and reactant gas distributing means. The guide vanes in the reactant gas distributing means allow the reactant gases to be displaced to the area between the central and peripheral portions of each single cell. The reactant gases may flow in various ways by following, for example, a linear, serpentine or spiral path. The gas sealing guide vane may be provided in the outermost peripheral portion of the reactant gas distributing means in order to ensure that the reactant gases will not be discharged to the surroundings of the cell stack comprising the superposed single cells and reactant gas distributing means. If reactant gas discharge slits are provided, the reactant gases can be discharged to the surroundings of the cell stack. A gas seal need not be provided for the entire portion of the single cells and reactant gas distributing means and may instead be provided in selected areas by means of glass O-rings. Sealing may be provided by an adhesive for ceramics in place of glass O-rings. If the reactant gases are discharged to the surroundings of the cell stack, a combustion flame will develop in the flame chamber around the cell stack. In this case, the fuel gas reformer and the oxidant or reactant gas inlet pipe can be heated by making use of the heat of the combustion flame. If no reactant gases are to be discharged into the flame chamber around the cell stack, the discharged gases are collected by the manifolds and allowed to react in the combustion chamber isolated from the stack chamber.

The reactant gases are directed by the reactant gas distributing means to flow between the central manifolds and the peripheral portion of the distributing means, and this obviates the need to provide an overall gas seal between the individual components of the fuel cell. A gas seal may be provided in selected areas near to the manifolds. The reactant gases flow between the central and peripheral portions of the reactant gas distributing means and this shorter travel path of the reactant gases effectively reduces the concentration gradient of these gases. The reactant gases discharged from the cell stack are burnt by reacting with each other between the flame barrier and the cell stack or within the combustion chamber partitioned from the cell stack, and the resulting heat of combustion may be effectively used.

BRIEF DESCRIPTION OF THE DRAWINGS

FIG. 10(B) being a plan view as seen in the direction indicated by arrow 10A—10A in FIG. 10(A);

FIGS. 11(A) and 11(B) show a porous substrate with a separator membrane for integration in a cell stack according to a fourth example of the present invention, with FIG. 11(A) being a plain view and FIG. 11(B) being a cross-section as viewed in the direction indicated by the arrow 11A—11A in FIG. 11(A);

FIGS. 12(A) and 12(B) show a porous substrate with a single cell for integration in a cell stack according to the fourth example of the present invention, with FIG. 12(A) being a plan view and FIG. 12(B) being a cross-section as viewed in the direction indicated by arrow 12A—12A in FIG. 12(A)

DETAILED DESCRIPTION OF PREFERRED EMBODIMENTS

Examples of the present invention are described hereunder with reference to the accompanying drawings.

EXAMPLE 1

Figure 1A:
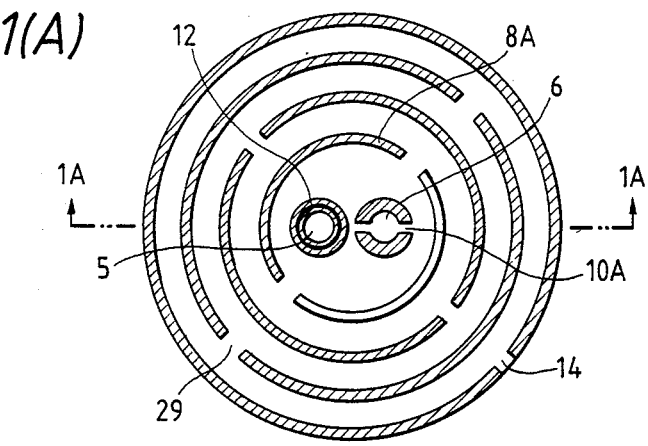
FIGS. 1(A) and 1(B) show a porous substrate with a separator membrane for integration in a cell stack according to a first example of the present invention, with FIG. 1(A) being a plan view and FIG. 1(B) being a cross section as viewed in the direction indicated by arrow 1A—1A in FIG. 1(A)
Figure 1B:
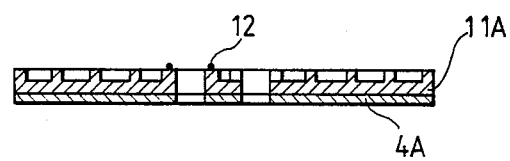

FIGS. 1(A) and 1(B) show a porous substrate with a separator membrane for integration in a cell stack according to a first example of the present invention. FIG. 1(A) is a plan view and FIG. 1(B) is a cross-section as viewed in the direction indicated by arrow 1A—1A in FIG. 1(A). The porous substrate 11A (reactant gas distributing means) is formed of lanthanum manganite ($LaMnO_3$). The separator membrane 4A is formed of a dense lanthanum chromite ($LaCrO_3$) layer. The separator membrane 4A is also part of the reactant gas distributing means. A manifold 6, through which an oxidant gas is supplied, and a manifold 5, through which a fuel gas is supplied, are provided as reactant gas passage holes in the central area of the porous substrate 11A with the separator membrane. Reactant gas supply slits 10A are formed in the oxidant gas supply manifold 6. The porous substrate 11A is provided with ribbed guide vanes 8A for directing the oxidant gas, slits 29 for radially guiding the oxidant gas, and a reactant gas discharge slit 14 through which the oxidant gas is to be discharged. Fitting around the ribs, which form the fuel gas supply manifold, is a gas sealing glass O-ring 12.

Figure 2A:
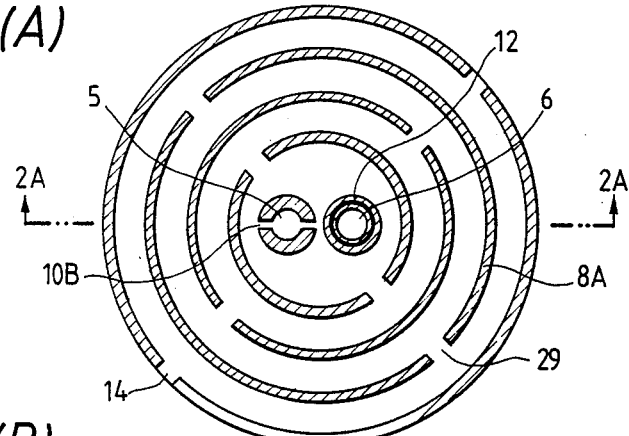
FIGS. 2(A) and (B) show a porous substrate with a single cell for integration in a cell stack according to the first example of the present invention, with FIG. 2(A) being a plan view and FIG. 2(B) being a cross section as viewed in the direction indicated by arrow 2A—2A in FIG. 2(A)
Figure 2B:
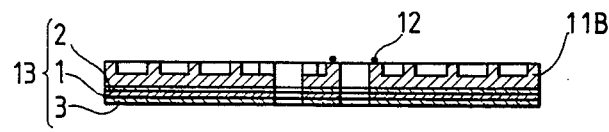

FIGS. 2(A) and 2(B) show a porous substrate with a single cell for integration in a cell stack according to the first example of the present invention. FIG. 2(A) is a plan view and FIG. 2(B) is a cross-section as viewed in the direction indicated by arrow 2A—2A in FIG. 2(A). The porous substrate 11B (reactant gas distributing means) is formed from a nickel-zirconia ($Ni—ZrO_2$) cermet. The single cell 13 is formed on the porous substrate 11B. The single cell 13 is composed of a solid electrolyte 1 made of yttria ($Y_2O_3$) stabilized dense zirconia, an anode 2 made of a porous $Ni—ZrO_2$ cermet, and a cathode 3 made of porous lanthanum manganite. An oxidant gas supply manifold 6 and a fuel gas supply manifold 5 are provided in the central area of the porous substrate 11B with single cell 13. Reactant gas supply slits 10B are formed in the fuel gas supply manifold 5. The porous substrate 11B is furnished with ribbed guide vanes 8A for directing the fuel gas, slits 29 for radially guiding the fuel gas, and reactant gas discharge slits 14 through which the fuel gas is to be discharged. Fitted around the ribs on the substrate which form the oxidant gas supply manifold 6 is a gas sealing glass O-ring 12.

The porous substrate 11A equipped with a separator membrane may be fabricated by the following method: a porous substrate with ribbed guide vanes that measures 300 mm×300 mm×2 mm is provided, and lanthanum chromite is densely plasma sprayed onto a flat major surface of this substrate to form the separator membrane 4A in a thickness of 40 mim. The porous substrate 11B equipped with a single cell may be fabricated by the following method: a porous substrate measuring 300 mm×300 mm×2 mm is provided, and a $Ni—ZrO_2$ cermet is loosely plasma sprayed onto a flat principal surface of this substrate to form the porous anode 2 in a thickness of 100 mim. Zirconia stabilized with yttria is thermal-sprayed onto the anode 2 to form the dense solid electrolyte 1 in a thickness of 30 mim. Subsequently, lanthanum manganite is plasma-sprayed to form the porous cathode 3 in a thickness of 800 mim. A dense, rather than porous, substrate may be fabricated using lanthanum manganite. In this case, too, a dense separator membrane formed of lanthanum chromite is necessary since lanthanum manganite is reduced in a reducing atmosphere.

Figure 3:
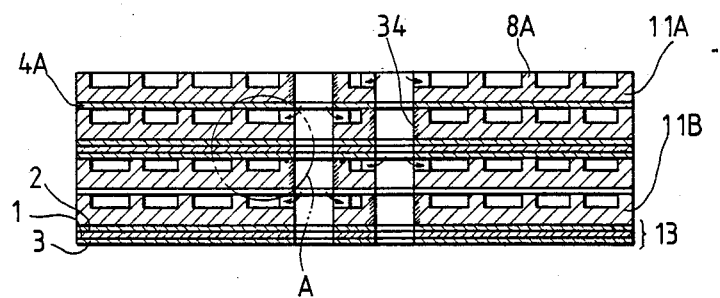
FIG. 3 shows a cross-section of a cell stack according to the first example of the present invention.

FIG. 3 shows a cross section of a cell stack in which the porous substrate 11A of FIG. 1(b) with a separator membrane and the porous substrate 11B of FIG. 2(b) with a single cell are alternately superposed one on another. Reactant gases are supplied through the reactant gas supply slits 10A and 10B in the directions indicated by arrows. The arrows on the right hand side show the streams of the oxidant gas, and those on the left-hand side show the streams of the fuel gas. By superposing the four substrates, the reactant gas passage holes are interconnected to form manifolds through which parallel flows of the respective reactant gases are supplied to the reactant gas distributing means.

Figure 4B:
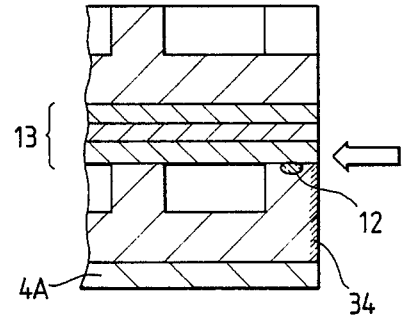
FIGS. 4(A) and 4(B) are enlarged views of portion A of FIG. 3, with FIG. 4(A) being a cross-section showing the state before heating and FIG. 4(B) showing the state after heating.
Figure 4A:
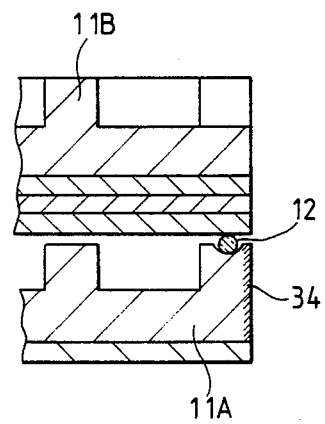

FIG. 4 is an enlarged view of portion A of FIG. 3. FIG. 4(A) is a cross-section showing the state before heating, and FIG. 4(B) after heating. Upon heating, the glass O-ring 12 is fused to provide a liquid seal. The ribs on the substrate around which the glass O-ring 12 is fitted have a filling or clogging portion 34 formed of a ceramic cement or some other suitable material on their inner surfaces.

The oxidant gas is admitted into the porous substrate 11A formed of lanthanum manganite. The oxidant gas, as guided by the guide vane 8A and slits 29, flows in a serpentine path toward the peripheral portion of the substrate 11A to be distributed to the cathode 3 of each single cell. The fuel gas, on the other hand, is admitted into the porous substrate 11B formed of a Ni—$ZrO_2$ cermet. The fuel gas flows in the same way as does the oxidant gas and is thus distributed to the anode 2 of each single cell. The separator membrane 4A prevents contact between the oxidant and fuel gases. The electromotive force (0.5–0.9 volts) generated in one single cell by an electrochemical reaction is added to the electromotive force generated in the other single cell connected in series to the first cell. The porous substrate 11A made of lanthanum manganite, the separator 4A made of lanthanum chromite and the porous substrate 11B made of a Ni—$ZrO_2$ cermet have electronic conductivity and permit a current to flow through a series circuit.

The separator membrane 4A, which has been formed by thermal spraying, is joined physically to the porous substrate 11A and this allows the two members to slide freely on each other by thermal expansion or contraction. The same is true with the relationship between the single cell 13 and the porous substrate 11B, and with the relationship between the anode 2, solid electrolyte 1 and cathode 3 of which the single cell is composed. Even if the porous substrate 11A with a separator membrane is alternately superposed on the porous substrate 11B with a single cell to make a cell stack, the separator membrane 4A (or single cell 13) and the porous substrate 11B or 11A are capable of freely sliding on each other by thermal expansion or contraction in response to a change in the temperature of the cell stack. This is because the reactant gases can be directed radially to the space between the central and peripheral portions of the reactant gas distributing means by merely stacking the porous substrate 11A with a separator membrane on the porous substrate 11B with a single cell. The gas seal provided by the glass O-rings 12 is limited to selected areas in the neighborhood of the manifolds formed in the porous substrates 11A and 11B. As already mentioned, the gas seal provided by the glass O-rings becomes a liquid seal upon heating and will hence be inert to the thermal expansion or contraction that might be experienced by the individual components of the cell stack. In addition, the reactant gases flow radially over a short path. This offers a great benefit to the case where the separator 4A and single cell 13 are formed on substrates because in such a "support membrane system" the travel path of reactant gases becomes inevitably long in order to enable cell stacking over a large area. After the reaction, the reactant gases are discharged from the periphery of the cell stack and burnt.

EXAMPLE 2

Figure 5A:
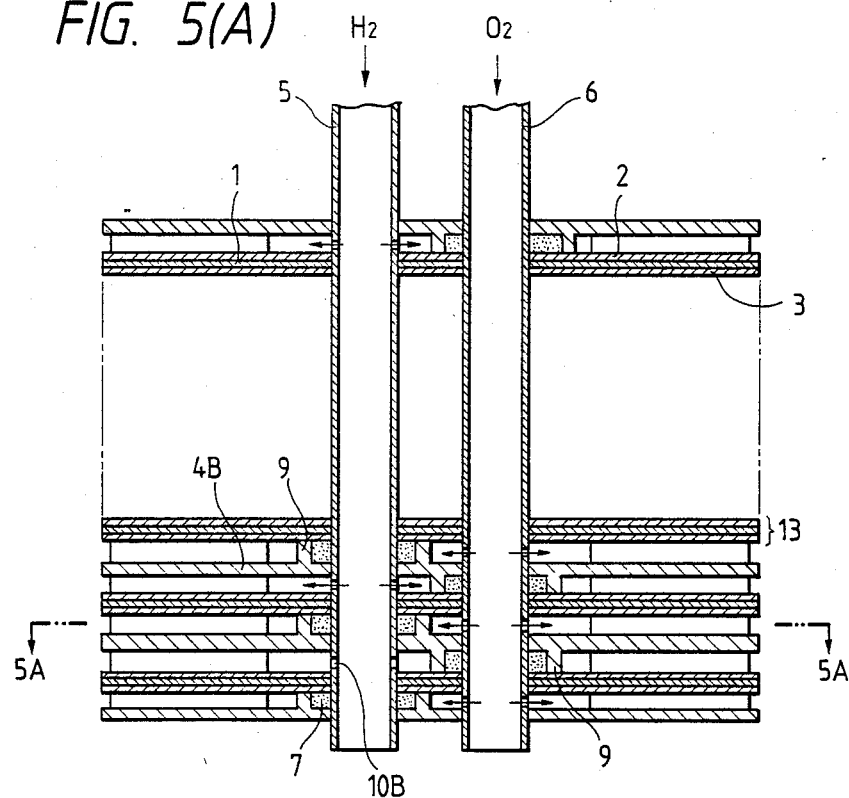
FIGS. 5(A) and 5(B) show a cell stack according to a second example of the present invention, with FIG. 5(A) being a cross-section and FIG. 5(B) being a plan view as viewed in the direction indicated by arrow 5A—5A in FIG. 5(A)
Figure 5B:
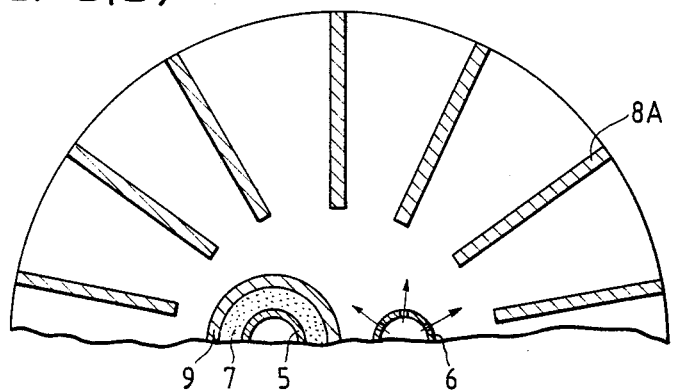

FIG. 5 shows a cell stack according to a second example of the present invention. FIG. 5(a) is a cross-section and FIG. 5(b) is a plan view as seen in the direction indicated by arrows C in FIG. 5(a). A fuel gas (hydrogen) is introduced into a separator plate 4B (reactant gas distributing means) by way of the fuel gas supply manifold 5. A reactant gas (oxygen) is introduced through the oxidant gas supply manifold 6 to be admitted into the separator plate 4B which is a self-supporting thin plate. The oxidant gas and the fuel gas are separately directed to the two principal surfaces of the separator plate 4B via reactant gas supply holes 10B. The reactant gas supply manifolds are reactant gas pipes that are made of zirconia stabilized with yttria ($Y_2O_3$).

The separator plate 4B is made of lanthanum chromite ($LaCrO_3$) and sauntered densely to give a thickness of 0.5–2 mm. Lanthanum chromite has electronic conductivity and will not be oxidized even if it is placed in an oxidizing atmosphere. A further advantage of lanthanum chromite is that it shows a thermal expansion coefficient close to that of yttria-stabilized zirconia. Single cells 13 are connected in series by this lanthanum chromite. Guide vanes 8A are provided on the two principal surfaces of the separator plate 4B. The guide vanes 8A direct the reactant gases to flow from the central area of the separator plate 4B toward its peripheral area. The oxidant gas thus reaches the cathode 3 of each single cell whereas the fuel gas reaches the anode 2 of the single cell.

The solid electrolyte 1 is a self-supporting thin plate having a thickness of 50–500 mim that is formed of yttria stabilized zirconia. Anode 2 and cathode 3 are baked to the two principal surfaces of the solid electrolyte 1. Anode 2 is made of Ni—$ZrO_2$ and its thickness is selected from the range of 0.01–1 mm. Lanthanum manganite is used as the active material of cathode 3. Both the anode and cathode are formed as porous structures.

A fuel cell with the construction described above has the advantage that the single cells 13 and separator plates 4B need not be provided with a gas seal and may be simply stacked alternately one on another. This permits the single cells 13 to freely slide on the separator plates 4B during thermal expansion without developing any thermal stress. The gaps left between each of the reactant gas supply manifolds 5 and 6 and the walls of through-holes made in the single cells 13 and separator plate 4B may be filled by providing seal walls 9 on the separator plates 4B and by forming a ceramic sealing portion 7 between the seal walls 9 and each of the reaction gas supply manifolds 5 and 6. The thermal stress that may be generated by the sealing portion 7 is so small that the thermal stress to be developed by the overall system will remain small. The reactant gases reaching the peripheral portion of the reactant gas distributing means are combusted in the sealing portion 7 to ensure that the temperature of the fuel cell is maintained at a predetermined high level.

The single cells as shown in FIG. 5 are of a disk shape but they may be otherwise shaped such as rectangular. The guide vanes 8A may also be designed in such a way that maximum cell characteristics can be attained by taking the concentration gradient of reactant gases into account.

The reactant gas supply manifolds 5 and 6 may be integrated into a single entity. In this case, the separate streams of two reactant gases will flow through the single reactant gas supply manifold, with the attendant advantage of reduction in the number of through-holes to be formed in the substrates.

Figure 6A:
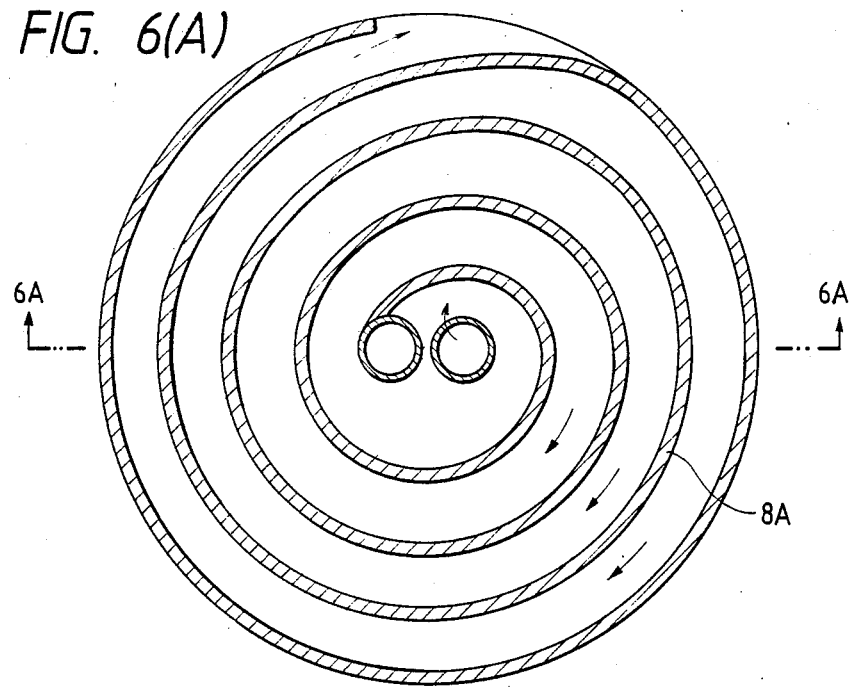
FIGS. 6(A) and 6(B) show a cell stack adopting a modified design of guide vanes, with FIG. 6(A) being a plan view and FIG. 6(B) being a cross-section as viewed in the direction indicated by arrow 6A—6A in FIG. 6(A)
Figure 6B:
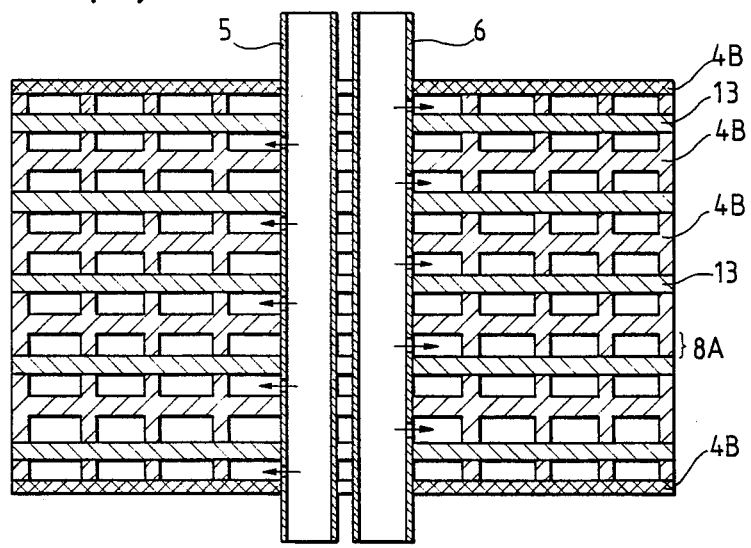

FIGS. 6(A) and 6(B) show a cell stack adopting a modified design of guide vanes 8A. FIG. 6(A) is a plan view and FIG. 5(A) is a cross section as viewed in the direction indicated by arrow 6A—6A in FIG. 6(A). The guide vanes 8A are formed as spiral coils. The pitch between adjacent turns of the spiral is selected at an optimum value which depends upon the diameter of the cell stack. The major advantage of this design is that the reactant gases can be admitted uniformly into the single cells 13 and that the discharged gases can be collected in one place.

Figure 7:
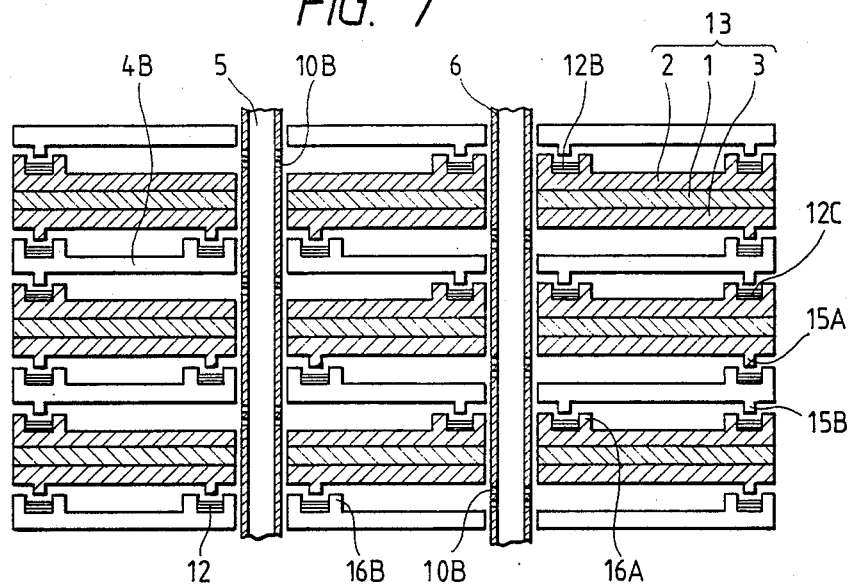
FIG. 7 shows a cross-section of a cell stack adopting a modified design of gas seal.

FIG. 7 shows a cross-section of a cell stack adopting a modified design of a gas seal. Each of the single cells 13 has an anode 2 and cathode 3 superposed on a circular solid electrolyte 1 and can be stacked alternately on circular separator plates 4B. A fuel gas supply manifold 5 and an oxidant gas supply manifold 6, which are both reactant gas pipes, are provided through the cell stack. A fuel gas discharge manifold and an oxidant gas discharge manifold, which make another pair of reactant gas pipes, are also provided through the cell stack but are not shown in FIG. 7.

The anode 2 of each single cell is provided with a glass reservoir 16A, in which a glass O-ring 12B is fitted. The cathode 3 of each single cell is provided with a projection 15A. A glass reservoir 16B is formed on the upper surface of each separator plate 4B whereas a projection 15B is formed on its lower surface.

A solid electrolyte fuel cell of the design described above may be fabricated by the following procedures. First, the circular solid electrolyte 1 (100-500 mim thick) is formed from yttria-stabilized zirconia. The solid electrolyte 1 has through-holes for insertion of the fuel gas supply manifold, oxidant gas supply manifold, fuel gas discharge manifold, and oxidant gas discharge manifold. A Ni—$ZrO_2$ cermet is thermal-sprayed onto one principal surface of the solid electrolyte 1 to form a porous anode 2 in a thickness of 100 mim. Lanthanum manganite is sputtered onto the other principal surface of the solid electrolyte 1 to form a porous cathode 3 in a thickness of 50-200 mim. Glass reservoir 16A, which resembles a gasket in shape and has a groove for storing glass, is press molded from a Ni—$ZrO_2$ cermet and fired at a temperature of 1,000° C. The separator plates 4B are press molded from lanthanum chromite into a form having not only through-holes for insertion of a fuel gas supply manifold and the other necessary manifolds but also glass reservior 16B and projection 15B. The molding is then fired to form a dense structure.

Glass O-rings 12B and 12C are fitted in glass reservoirs 16A and 16B, respectively. The O-rings are formed of a soda lime glass having a melting point of 900° C. and a working temperature of 1,000° C. The single cells 13 are alternately superposed on the separator plates 4B and the fuel gas supply manifold and the other necessary manifolds are set within the through-holes. The operating temperature of the fuel cell is maintained at 1,000° C. for a sufficient duration of time to have the glass reservoir 16A and projection 15A baked to the anode 2 and cathode 3, respectively, of each single cell. The glass O-rings 12B and 12C are fused to enable liquid sealing. The fuel and oxidant gases that have undergone the reaction are discharged through the associated discharge manifolds (not shown). The discharged gases are not burnt around the cell stack, but instead are reacted within an isolated combustion chamber.

When the cell operation ends, the glass from which the O-rings are made solidifies but the soda lime glass having a greater linear expansion coefficient than zirconia and other electrode materials represents such a relatively small portion of the space in the glass reservoirs 16A and 16B that it will not cause cracking damage in the other components of the cell.

Figure 8:
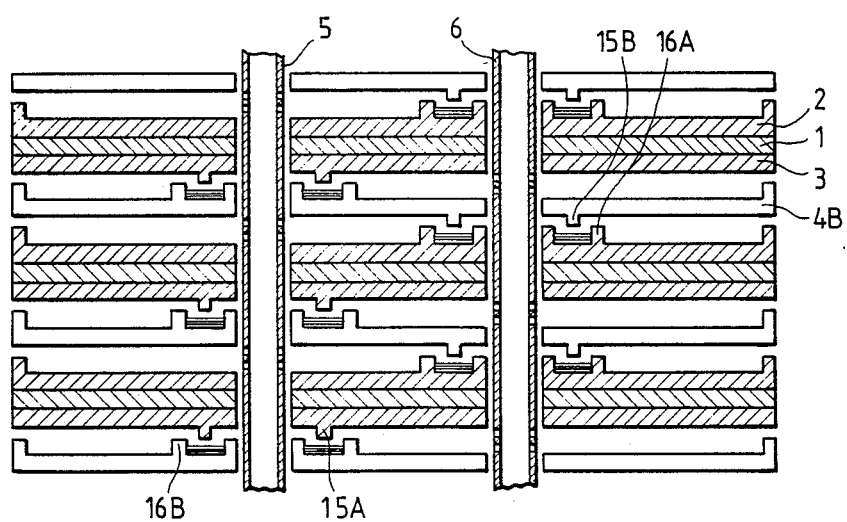
FIG. 8 shows a cross-section of a cell stack adopting another modification of gas seal.

FIG. 8 shows a cross section of a cell stack adopting another modification of the gas seal. In the absence of reactant gas discharge manifolds, gas sealing need not be effected around the cell stack. The discharged gases are burnt around the cell stack.

EXAMPLE 3

Figure 9:
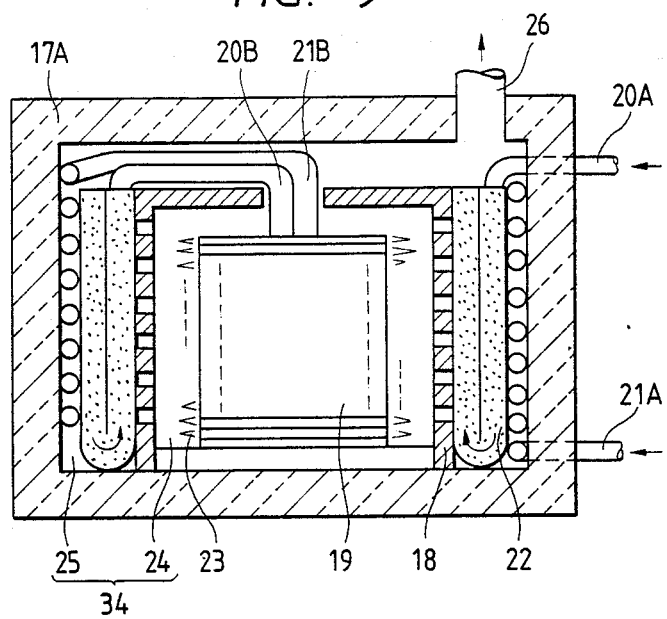
FIG. 9 shows a cross-section of a solid eledtrolyte fuel cell having a combustion chamber according to a third example of the present invention.

FIG. 9 shows a cross-section of a solid electrolyte fuel cell having a combustion chamber according to a third example of the present invention. The combustion chamber 34 is provided around the cell stack. A natural gas (fuel gas) and steam are introduced from a pipe 20A and proceed down a fuel reformer 22, make a U-turn at the bottom, ascend to the top and enter a cell stack 19 via another fuel gas inlet pipe 20B. In this process, the natural gas is heated in a preheating chamber 25 and reformed to hydrogen, CO, and $CO_2$ with the aid of the catalyst in the fuel reformer. The temperature suitable for reforming is within the range 700°-850° C., so that satisfactory reforming can be accomplished with the discharged gases or combustion gases from the fuel cell of the present invention which operates in the temperature range of 800°-1,000° C. Air, as an oxidant gas, flows spirally around the fuel reformer by passing through a route that starts with an oxidant gas inlet pipe 21A and ends with another oxidant gas inlet pipe 21B and in this process, the air is preheated to a temperature close to the operating temperature of the cell and introduced into the cell from above the central portion of the cell stack 19.

The respective reaction gases react with each other within the cell stack and the unreacted hydrogen and oxygen, together with the product water, are discharged into a flame chamber 24 that surrounds the cell stack. The discharged $H_2$, $O_2$ and $H_2O$ mix in the flame chamber 24 and are burnt to form a combustion flame 23. A flame barrier 18 is disposed in such a way that the fuel reformer 22 will not be directly heated with the flame. On the other hand, the flame barrier 18 has small holes in it to provide a minimum barrier against heat. The combustion gases, i.e., steam, carbon dioxide and nitrogen, are cooled in the preheating chamber 25 and recovered from the cell stack through a discharged gas vent 26. Even after being cooled in the preheating chamber 25, the discharged gases are still hot enough so that they may be utilized to produce lukewarm water.

The vessel of the fuel reformer and the oxidant gas inlet pipes 21A and 21B may suitably be formed of a heat resistant alloy such as Incoloy 800H, whereas the flame barrier 18, may suitably be formed of a thin refractory brick or alumina. The cell stack 19, flame chamber 24, flame barrier 18 and preheating chamber are encased in a heat insulator 17A.

Figure 10A:
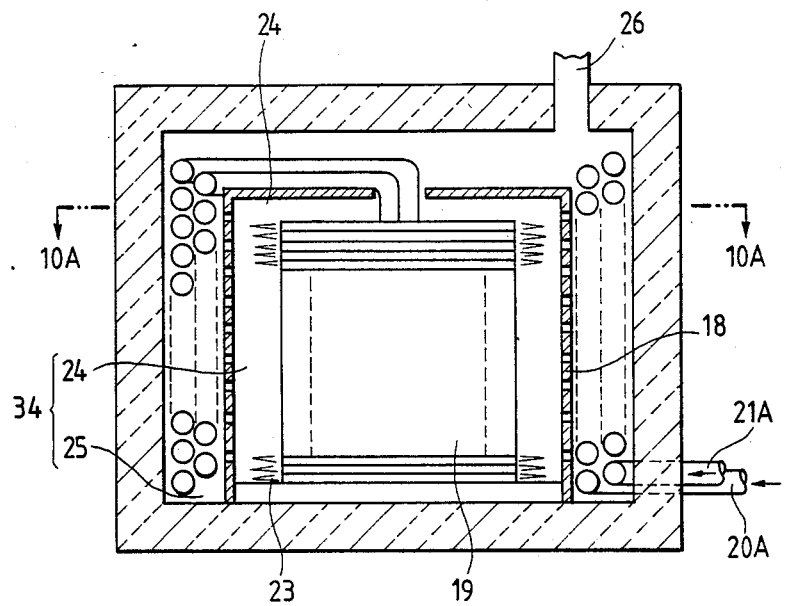
FIGS. 10(A) and 10(B) show a solid electrolyte fuel cell adopting a modified design of combustion chamber, with FIG. 10(A) being a cross-section.
Figure 10B:
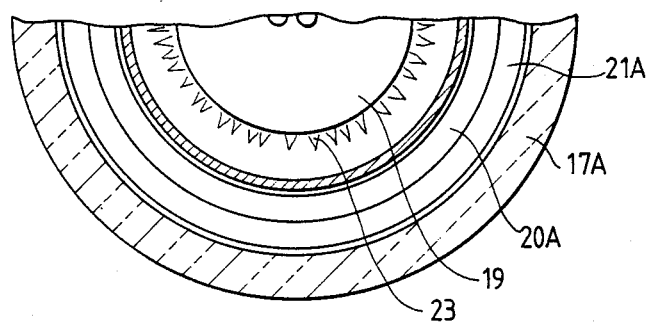

FIGS. 10(A) and 10(B) show a solid electrolyte fuel cell adopting a modified design of combustion chamber. FIG. 10(A) is a cross section and FIG. 10(B) is a plan view as seen in the direction indicated by arrow 10A—10A in FIG. 10(A). The fuel gas inlet pipe 20A and the oxidant gas inlet pipe 21A are heated in the preheating chamber 25.

EXAMPLE 4

FIGS. 11(A) and 11(B) show a porous substrate 11C with a separator membrane for integration in a cell stack according to a fourth example of the present invention. FIG. 11(A) is a plan view and FIG. 11(B) is a cross section as viewed in the direction indicated by arrow 11A and 11A in FIG. 11(A). The porous substrate 11C has oxidant gas supply manifolds 6 and fuel gas supply manifolds 5 which are formed in the four corners of the substrate, as well as a fuel gas discharge manifold 27 and an oxidant gas discharge manifold 28 which are both formed in the central area of the substrate. The substrate is also provided with ribbed guide vanes 8A for directing the oxidant gas from the central area of the substrate to its peripheral area, and a ribbed guide vane 8B for providing a gas seal. The constituent materials of the separator 4C and porous substrate 11C and the processes for fabricating them are essentially the same as those described in connection with the porous substrate 11A with a separator membrane shown in FIG. 1.

FIGS. 12(A) and 12(B) show a porous substrate with a single cell for integration in a cell stack according to the fourth example of the prevention invention. FIG. 12(A) is a plan view and FIG. 12(B) is a cross-section as viewed in the direction indicated by arrow 12A—12A in FIG. 12(A). The constituent materials of the single cell 13 and porous substrate 11D and the processes for fabricating them are essentially the same as those described in connection with the porous substrate 11B with a single cell shown in FIG. 2.

Figure 13:
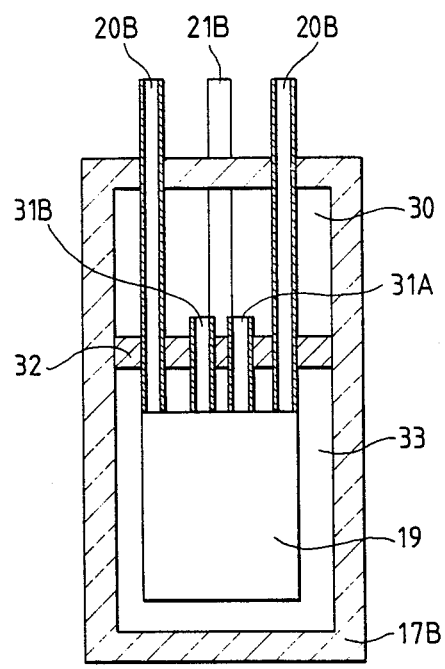
FIG. 13 is a partial longitudinal section of a solid electrolyte fuel all having a combustion chamber according to a fifth example of the present invention.

The porous substrate 11C with a separator membrane and the porous substrate 11D with a single cell are alternately superposed one on another to form a cell stack 19 as shown in FIG. 13.

EXAMPLE 5

FIG. 13 is a partial longitudinal section of a solid electrolyte fuel cell having a combustion chamber according to a fifth example of the present invention. The fuel gas passes through a fuel gas inlet pipe 20B, the fuel gas supply manifold 5 shown in FIGS. 11(A) and 12(A), the fuel gas discharge manifold 27 shown in FIGS. 11(A) and 12(A), and a fuel gas outlet pipe 31B. The oxidant gas passes through an oxidant gas inlet pipe 21B, the oxidant gas supply manifold 6 shown in FIGS. 11(A) and 12(A), the oxidant gas discharge manifold 28 shown in FIGS. 11(A) and 12(A), and an oxidant gas outlet pipe 31A.

The discharged gases are burnt in a combination chamber 30. The heat of combustion is used to heat the fuel gas inlet pipe and the oxidant gas inlet pipe so as to preheat the reaction gases flowing through these pipes. The combustion chamber 30 is isolated from a stacking compartment 33 by a fire retarding wall 32. The combustion chamber 30 and the stacking compartment 33 are encased in a heat insulator 17B. The reactant gases are preheated before they are admitted into the stack 19 and this is effective in preventing thermal failure from occurring in the ceramic materials of which the fuel cell is made. In addition, the temperature of the single cells in the fuel cell system is maintained at a predetermined high level to improve its characteristics.

What is claimed is:

1. A solid electrolyte fuel cell comprising a plurality of superposed planar single cells each having a cathode and an anode disposed on the two principal surfaces of a solid electrolyte substrate and having superposed thereon reactant gas distributing means for supplying individually two reactant gases, an oxidant gas and a fuel gas, to the two electrodes of each single cell, said reactant gas distributing means having guide vane means for directing the reactant gases into the space between a central portion of each single cell and a peripheral portion of each single cell, said distributing means comprising means for establishing electrical connection to the single cells; said fuel cell including manifolds which penetrate through the central area of the superposed single cells to supply flows of reactant gases to be supplied to or discharged from the anode and cathode of each single cell via the reactant gas distributing means.

2. A solid electrolyte fuel cell comprising a plurality of superposed planar single cells each having a cathode and an anode disposed on the two principal surfaces of a solid electrolyte substrate and having superposed thereon reactant gas distributing means for supplying individually two reactant gases, an oxidant gas and a fuel gas, to the two electrodes of each single cell, characterized in that:

(1) the reactant gas distributing means having guide vanes adapted to direct the reactant gases into the space between respective central and peripheral portions of each single cell and also a reactant gas discharge slit in the peripheral portion for allowing the reactant gases to be discharged, said distributing means comprising means for establishing electrical connection to the single cells;

and the fuel cell also comprises (2) manifolds which penetrate the superposed single cells and reactant gas distributing means to supply the flows of reactant gases to, and to exhaust reactant gases from, the reactant gas distributing means;

(3) a flame barrier that is disposed around the superposed single cells except for portions of said manifolds to block a combustion flame that is generated from the reactant gases exhausted from said reactant gas distributing means; and (4) a heat insulator that accommodates all of said fuel cell, including said flame barrier and forms a preheating chamber about said excepted portions of said manifolds.

3. A solid electrolyte fuel cell comprising a plurality of superposed planar single cells each having a cathode and an anode disposed on the two principal surfaces of a solid electrolyte substrate and having superposed thereon reactant gas distributing means for supplying individually two reactant gases, an oxidant gas and a fuel gas, to the two electrodes of each single cell, characterized in that:

(1) the reactant gas distributing means comprises guide vane means for directing the reactant gases into the space between respective central and peripheral portions of each single cell and comprises means for establishing electrical connection to the single cells, the guide vane means including guide vane means in the peripheral portion for sealing the reactant gases; said fuel cell further comprising (2) manifolds that penetrate through the superposed single cells and reactant gas distributing means to supply and discharge the flows of reactant gases to and from the distributing means inward of the reactant gas sealing guide vane means; and (3) a combustion chamber for combusting the discharged reactant gases, said combustion chamber comprising a flame retardant wall partitioning the superposed single cells therefrom.

4. A solid electrolyte fuel cell according to claim 1, 2 or 3 in which the manifolds include manifolds in the form of reactant gas pipes.

5. A solid electrolyte fuel cell according to claim 1, 2 or 3 in which the manifolds include manifolds in the form of reactant gas passage holes.

6. A solid electrolyte fuel cell according to claim 1, 2 or 3 in which the guide vane includes guide vane means for directing the reactant gases in a linear path.

7. A solid electrolyte fuel cell according to claim 1, 2 or 3 in which the guide vane means includes guide vane means for directing the reactant gases in a serpentine path.

8. A solid electrolyte fuel cell according to claim 1, 2 or 3 in which the guide vane means includes guide vane means for directing the reactant gases in a spiral path.

9. A solid electrolyte fuel cell according to claim 1, 2 or 3 in which the plurality of superposed single cells comprise self-supporting single cells in a thin sheet form.

10. A solid electrolyte fuel cell according to claim 1, 2 or 3 in which the plurality of superposed single cells comprise single cells in membrane form supported on substrates.

11. A solid electrolyte fuel cell according to claim 1, 2 or 3 in which the reactant gas distributing means has the form of self-supporting, dense, thin sheets.

12. A solid electrolyte fuel cell according to claim 1, 2 or 3 in which the reactant gas distributing means comprising a porous substrate with guide vanes and a substrate that supports a dense separator membrane on one principal surface and that has guide vanes on the other principal surface.

13. A solid electrolyte fuel cell according to claim 1, 2 or 3 which includes gas-sealing glass O-rings.

14. A solid electrolyte fuel cell according to claim 1, 2 or 3 which includes gas-sealing ceramic sealing portions.

15. A solid electrolyte fuel cell according to claim 1 in which the reactant gas distributing means has reactant gas discharge slits in the peripheral portion of each single cell.

16. A solid electrolyte fuel cell according to claim 1 in which the guide vane means includes guide vane means for sealing the reactant gases in the peripheral portion of the reactant gas distributing means, and manifolds that penetrate through the superposed single cells and reactant gas distributing means in their respective peripheral portions and inward of each said gas sealing guide vane means.

17. A solid electrolyte fuel cell according to claim 2 which includes a fuel gas reformer and an oxidant gas inlet pipe in the preheating chamber.

18. A solid electrolyte fuel cell according to claim 2 which includes reactant gas inlet pipes in the preheating chamber.

19. A solid electrolyte fuel cell according to claim 3 which includes reactant gas inlet pipes connecting to the manifolds and penetrating through the interior of the combustion chamber, and reactant gas outlet pipes connecting to the manifolds and having open ends inserted into the combustion chamber.

* * * * *